April 23, 1929.   H. F. DUNCAN   1,710,611
HARVESTER
Filed Dec. 2, 1925   7 Sheets-Sheet 5
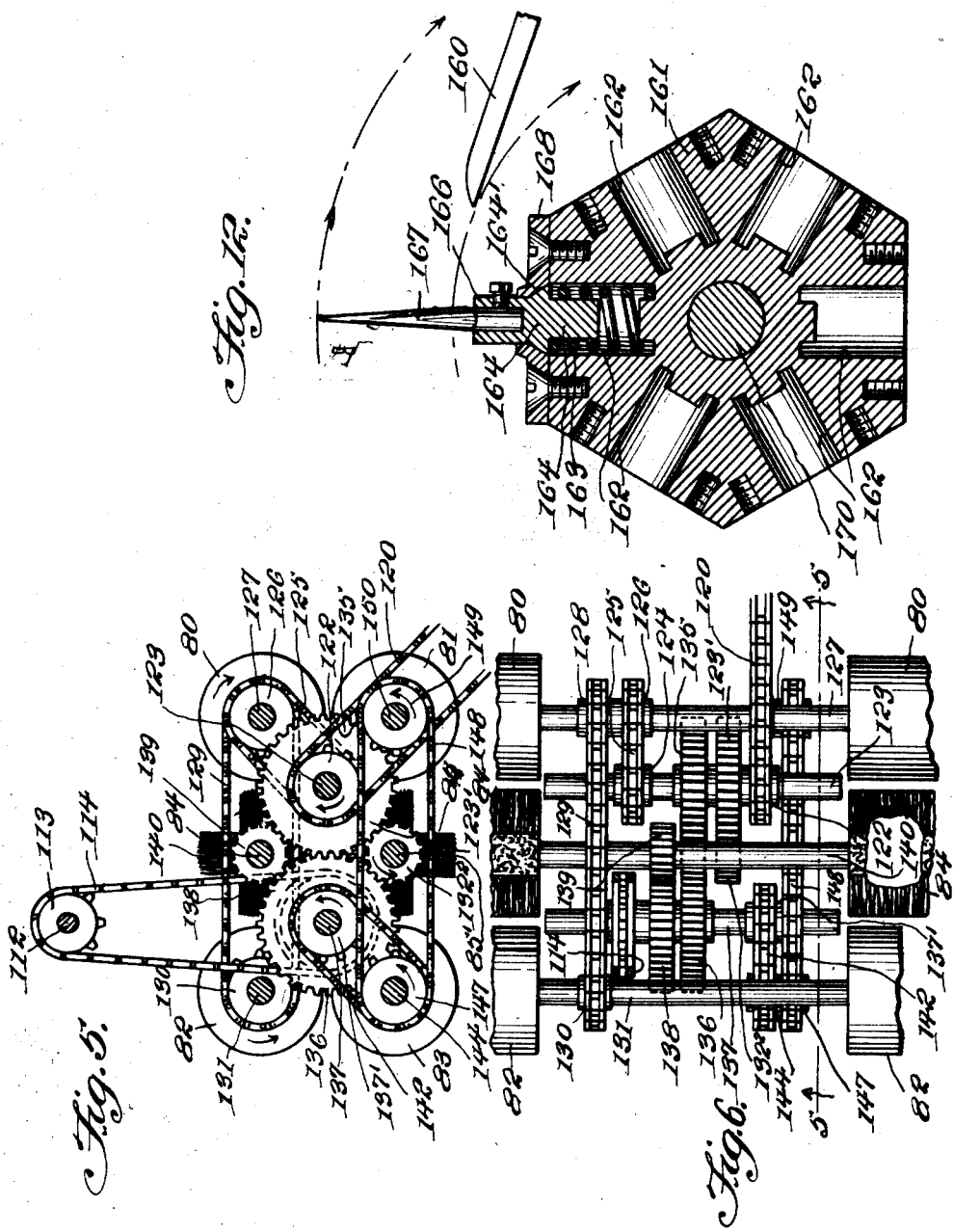
Harry F. Duncan
INVENTOR
BY Victor J. Evans
ATTORNEY
WITNESS:

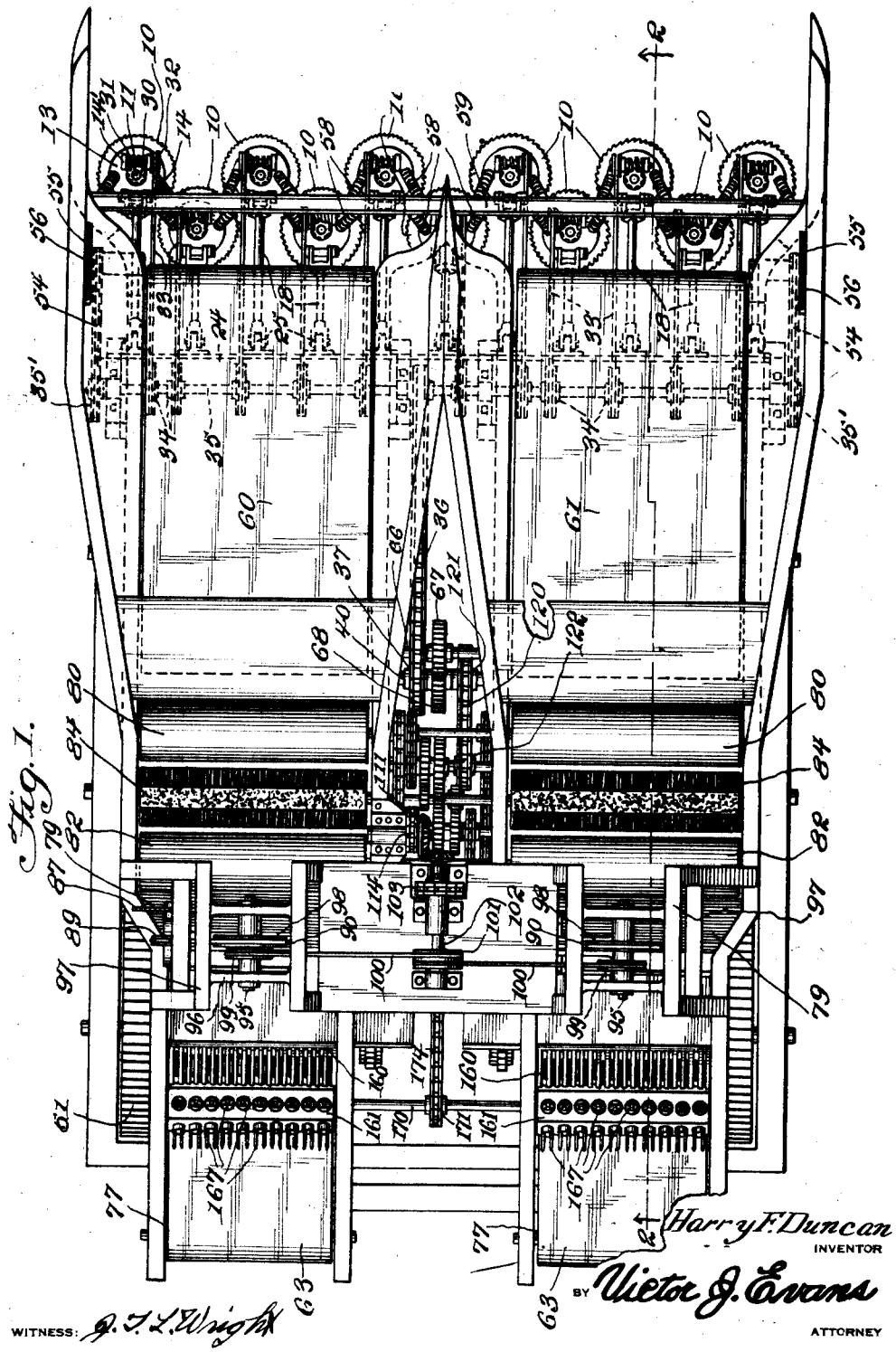

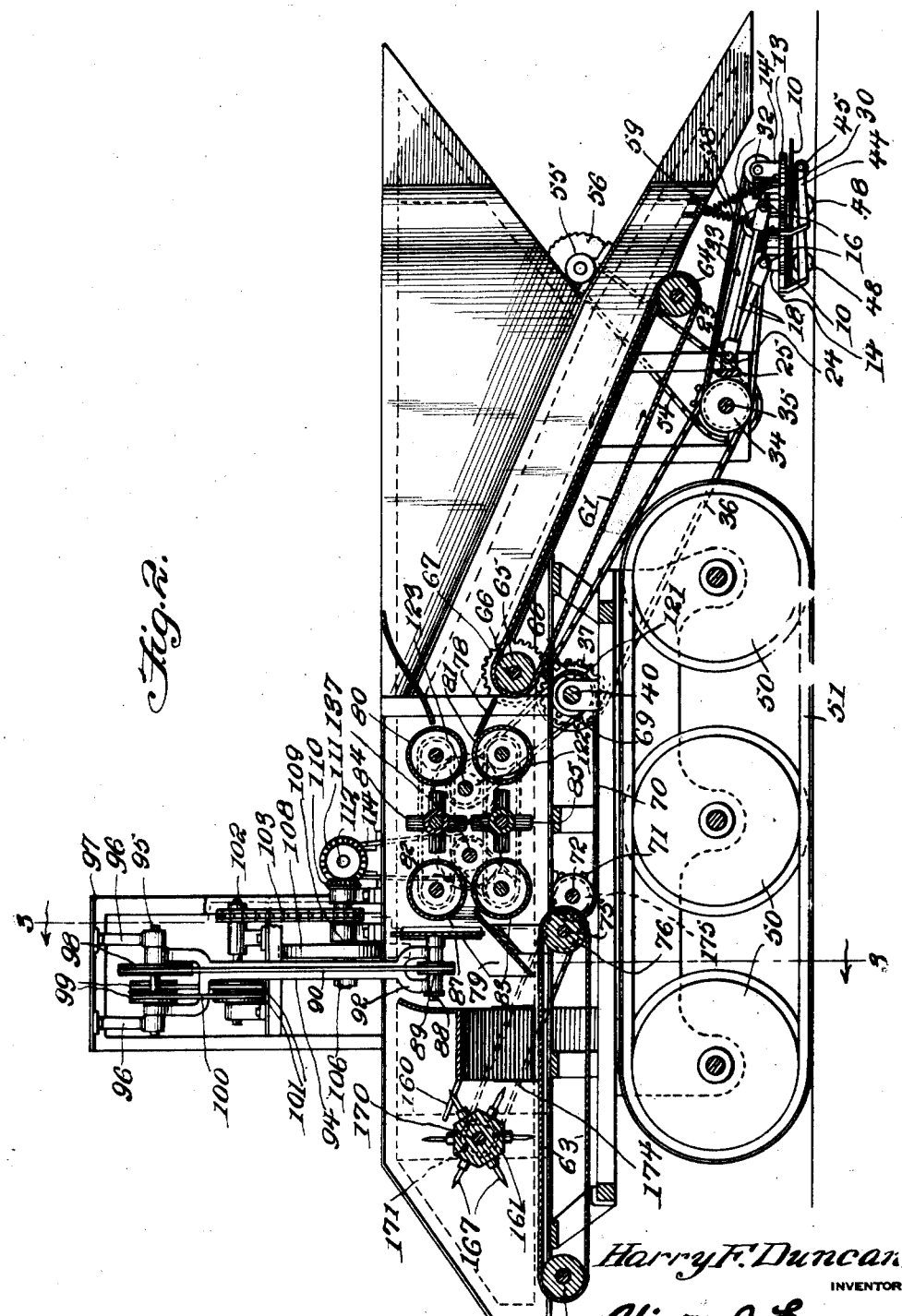

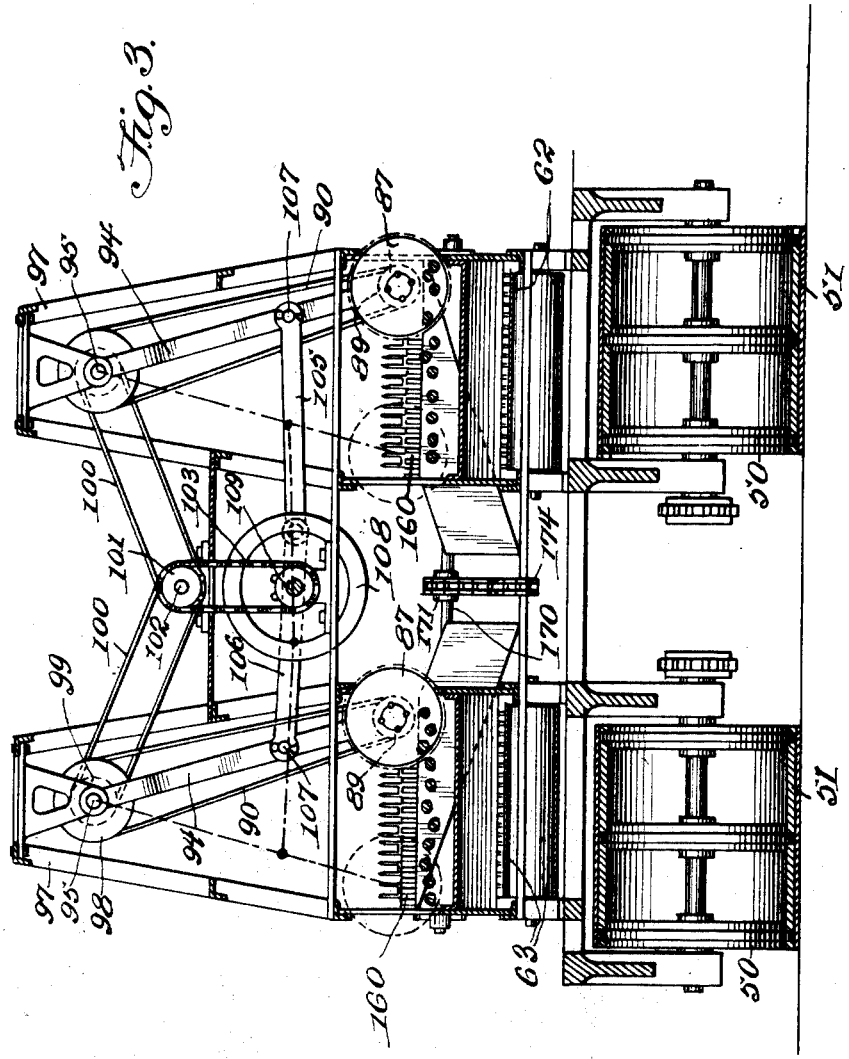

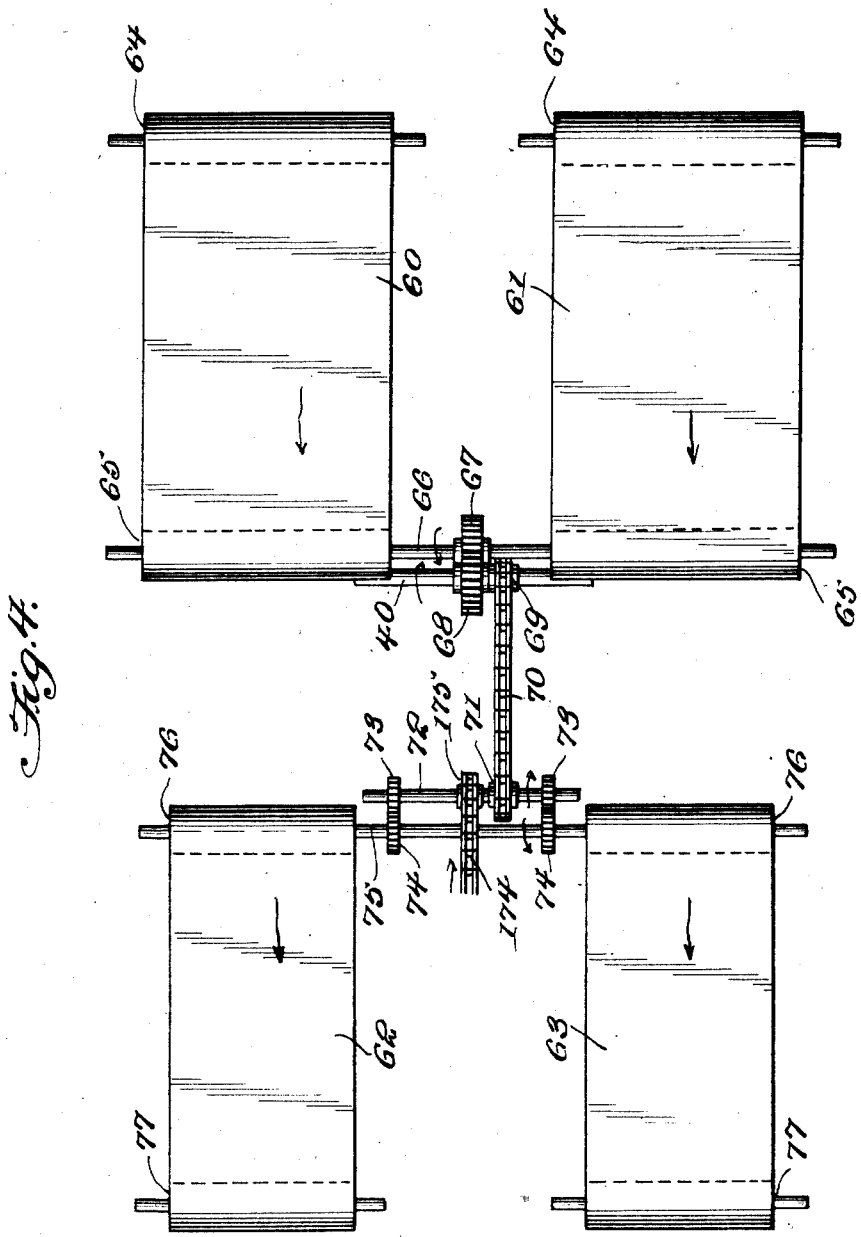

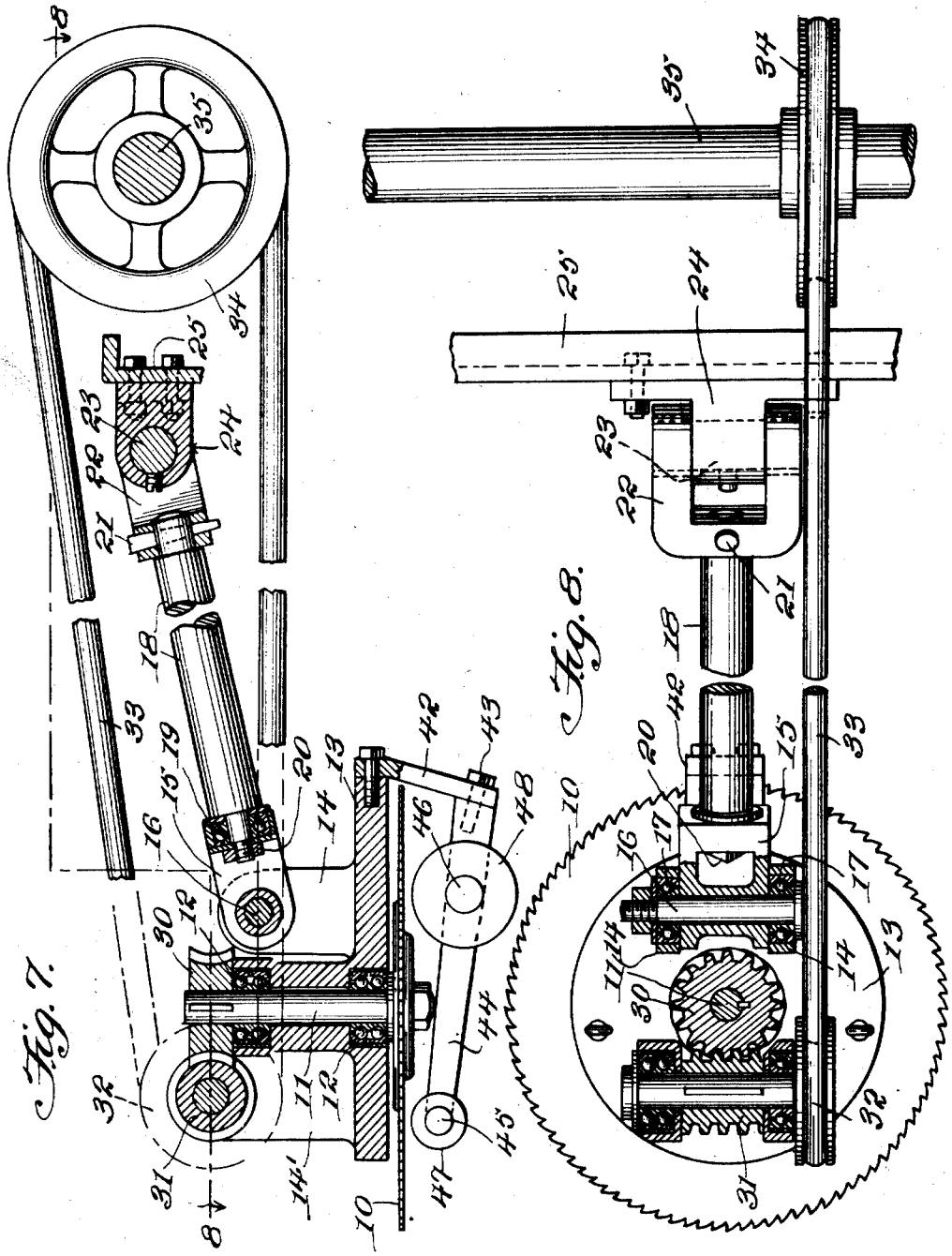

April 23, 1929.  H. F. DUNCAN  1,710,611
HARVESTER
Filed Dec. 2, 1925  7 Sheets-Sheet 7
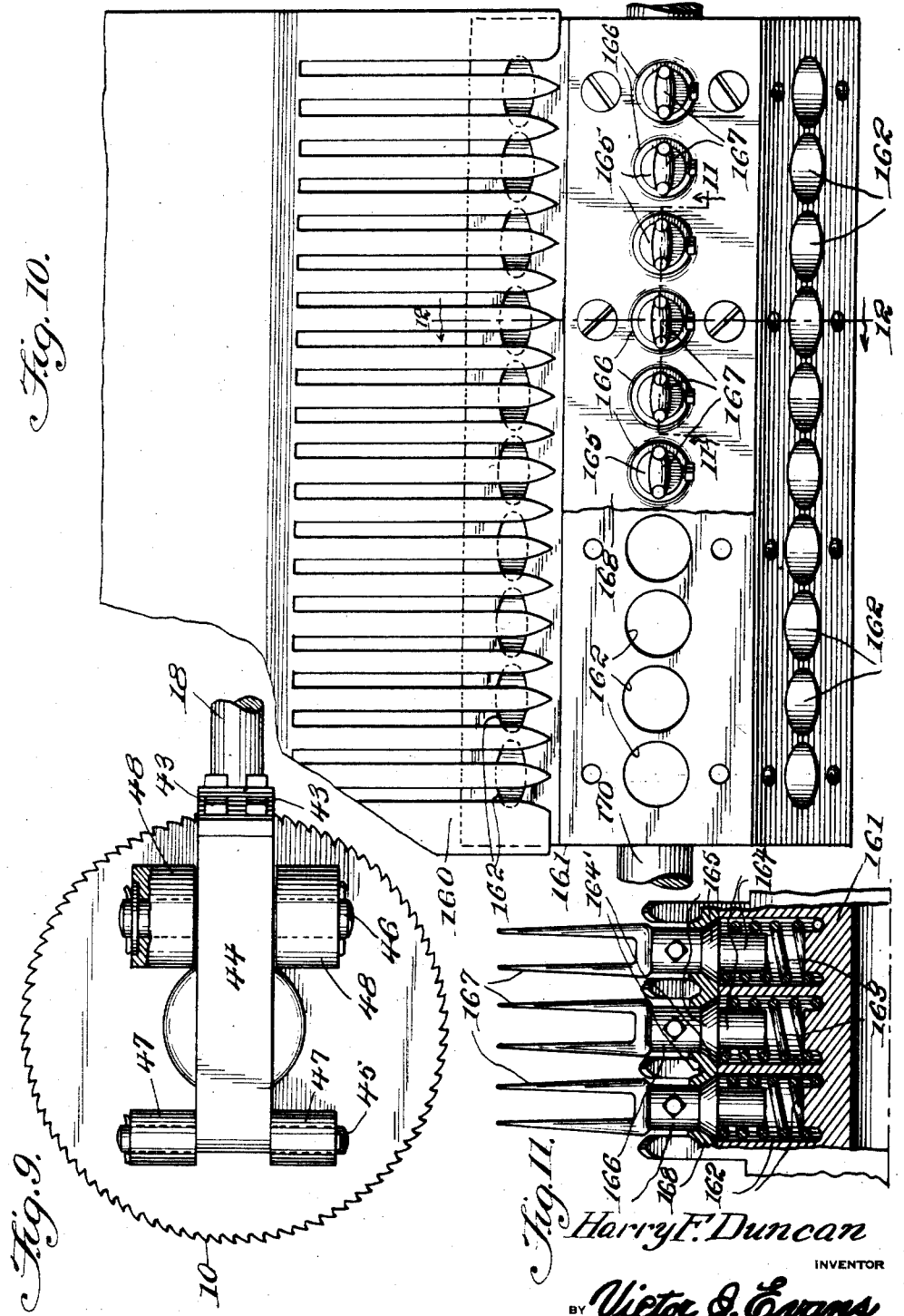

Patented Apr. 23, 1929.

1,710,611

UNITED STATES PATENT OFFICE.

HARRY F. DUNCAN, OF EWA, TERRITORY OF HAWAII.

HARVESTER.

Application filed December 2, 1925. Serial No. 72,751.

This invention relates to harvesters, especially adapted for use in cutting sugar cane, but also suitable for use under other conditions.

The machine comprises the harvesting mechanism proper, which cuts the cane close to the ground, removes the leaves, cuts the cane into suitable lengths and separates the unripe tops from the cut cane, and the machine also includes the tractor upon which the harvesting mechanism is carried, and from which, in practice, the driving power will be derived, although in order to simplify the drawings to some extent, the engine has been omitted from the several views.

The object of the invention is to provide improved cutting mechanism at the forward part of the machine, whereby the cane will be cut in the most effective and economical manner, under practically all conditions, especially when the surface of the ground is uneven, and to secure this result by employing a series of independently adjustable cutters.

A further object is to provide particular means for cutting the cane into short lengths as it passes from a series of brushes and rollers.

A further object is to provide means for removing the undesirable portions of the product as the latter passes over a conveyor at the rear of the brushes.

A further object is to provide particular driving mechanism in connection with the principal moving elements of the device.

A further object is to provide for discharging the cane directly into cars for transportation to the factory, or to provide for discharge in some other approved manner, whereby the cost of re-loading for transportation will be avoided.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1 is a top plan view of the machine.

Figure 2 is a vertical longitudinal section, on the line 2—2 of Figure 1.

Figure 3 is a vertical transverse section on the line 3—3 of Figure 2.

Figure 4 is a top plan view showing forward and rear conveyors, on opposite sides of the machine, and means for driving the conveyors.

Figure 5 is a vertical section of the driving means for the rollers and brushes, the section being on line 5—5 of Figure 6.

Figure 6 is a top plan view of the structure of Figure 5.

Figure 7 shows one of the independently adjustable cutters, for cutting the standing cane near the surface of the ground, the view being chiefly in vertical section.

Figure 8 is a section on line 8—8 of Figure 7.

Figure 9 is a bottom plan view of the structure at the left of Figure 7.

Figure 10 is a plan view of the stripper plate and the rotatable element cooperating therewith, this element carrying forks for removing the unripe tops, etc.

Figure 11 is a fragmentary view in section, on line 11—11 of Figure 10.

Figure 12 is a section of the rotatable element of Figure 10, the section being on line 12—12 of Figure 10.

The independently adjustable cutters mounted at the forward part of the machine constitute an important feature of the invention, since they permit especially the economical and effective cutting of the cane near the surface of the ground and regardless of the contour of the surface, and the position of the cane with reference to the furrow. These cutting devices are shown in Figure 1 as being mounted in two series and in staggered relation, so that the cane which is not engaged by the forward cutters will be engaged and cut by those in the rear line.

The cutters per se are designated 10 and are each mounted on a vertical shaft or spindle 11 operating in ball bearings, such as 12. The horizontally disposed cutter blocks are designated 13 and each of these blocks carries in spaced relation vertical standards or the like designated 14, between which I mount the block 15 having connection with the elements 14 by means of a pin, bolt or axle 16. Ball bearings are shown at 17, and the purpose is to mount the blocks 13 and the cutters 10 in such manner that they will have absolute freedom of movement. Arms 18 have swivel connection with heads 15, ball bearings being shown at 19, and the lower ends of arms 18 being secured as shown at 20. The upper ends of arms 18 are connected by pins 21 with yokes or the like designated 22, these yokes receiving transverse pins 23 passing through brackets 24 secured by bolts to transverse bar 25.

Vertical spindles 11 rigidly mounting the cutters 10, have connected rigidly with the upper ends thereof wheels 30 driven by means of spiral elements 31 mounted in the upstanding elements 14' of the blocks 13. Rigid with reference to each worm element 31 is a pulley wheel 32 driven by a belt or chain 33, these chains 33 passing over wheels 34 on transverse shaft 35, this shaft being driven by means of chain 36 and sprocket wheel 37 on main driving shaft 40. This shaft 40 receives its power from the engine of the tractor, the engine being omitted, however, from the drawings.

Carried by the cutter blocks 13, and by the rear portion thereof, are brackets or the like designated 42, these brackets being connected at 43 with forwardly extending bars 44, shown especially in bottom plan in Figure 9, and illustrated in elevation in Figure 7. Passing through bars 44 are pins 45 and 46, the former mounting rollers 47, and the pins 46 mounting rollers 48 of greater diameter. The small rollers 47 are near the forward edges of the saws or cutters 10, and it will be observed that in view of the reduced diameter of these rollers as compared with the diameter of rollers 48, the cutters at their forward edges will be close to the surface of the ground,—tilting on an inclined surface.

The tractor portion of the construction includes a plurality of supporting wheels, such as wheels 50 of Figure 2 and Figure 3, these wheels carrying an endless element 51 constituting a tread member. The engine will be carried between the running gear mounted on opposite sides of the structure as shown in Figure 3. The drive from the engine will then be direct to shaft 40 shown in Figure 2 and elsewhere. Shaft 35 driven through chain 36 from a sprocket wheel on shaft 40, mounts a sprocket wheel 35' driving chain or belt 54. Chain or chains 54 drive wheels 55 and rotary cutters 56 on opposite sides of the machine, and located as shown in Figures 1 and 2, these cutters being for the purpose of taking care of cane in a reclining or approximately horizontal position.

In connection with the vertically adjustable cutters 10 at the forward part of the machine, a feature of special importance is found in the resilient mounting by means of springs 58 secured to bar 59, and secured to the cutter blocks. These springs prevent the cutter blocks from dropping beyond a predetermined limit, but they permit of freedom of movement of the cutters and the blocks on which they are mounted and insure the return thereof to normal position when temporarily thrown out of line owing to the uneven surface of the ground.

The conveyor mechanism is shown in Figure 4, and includes two forward conveying elements designated respectively 60 and 61, and two rear conveyors, designated respectively 62 and 63, the forward conveyors being inclined in the manner illustrated in Figure 2. These conveyors pass over the lower rollers, such as 64, and over upper rollers, such as 65, the upper rollers being on transverse shaft 66 carrying a gear wheel 67 rigidly therewith, and the gear wheel being driven by gear wheel 68 on the main driving shaft 40. Shaft 40 carries a pulley wheel 69 driving belt 70 passing over pulley wheel 71 on shaft 72 mounting gear wheels 73 which drive gear wheels 74 on shaft 75. This shaft 75 carries rollers 76 driving conveyor belts 62 and 63, the latter passing over other rollers, such as 77.

The chain passing from the forward conveyors 61 passes thence over a plate or the like 78, to the series of rollers and brushes shown in the central portion of Figure 2 and shown further in Figure 5. After leaving these brushes and rollers the chain passes downwardly over slide plate or chute 79, and thence to rear conveyors 62 and 63. It will be observed from Figure 4 that the conveyor mechanism corresponds on opposite sides of the machine and in fact the mechanism is practically duplicated on opposite sides of the machine, two series of rollers, brushes, etc., being provided, also two swinging saws or cutters, shown in top plan in Figure 1, and one of these saws being shown in elevation, together with the mounting means thereof, in Figure 2.

Referring especially to Figures 2, 5 and 6, the upper forward rollers are designated 80, and the cane is received from the forward conveyors and from the plate 78 between upper roller 80 and lower forward roller 81. Rear upper rollers 82 cooperate with lower rollers 83, and between these several rollers, I mount brushes 84 and 85, all of the rollers and the brushes rotating about horizontal axes. The action of the brushes on the cane, in a machine of this kind, and the action of the rollers is well understood, and the cane passing from the rear rollers 82 and 83 is cut into suitable lengths by means of saws or cutters 87 mounted on short shafts 88 which in turn mount pulley wheels 89, driven by belts 90 of Figure 3 and elsewhere. These saws and the axial elements thereof are mounted in yokes or forks 92 carried by the lower ends of swinging arms 94 movable about upper axles 95 supported in bearings 96 in the upper framework 97. The belts 90 pass over pulley wheels 98, and rigid with reference to the latter are pulley wheels 99 driven by belts 100 from pulley wheels, such as 101 on shaft 102.

In order to impart oscillating or swinging movement to arms 94 mounting the swinging saws, I connect these arms 94 with rods 105 and 106, the points of pivotal connection being at 107. The inner ends of connecting rods 105 and 106 have eccentric connection with crank wheel 108 mounted on shaft 109. This shaft last named is shown in Figure 3 and is further shown in Figure 2 as having a beveled gear wheel 110 mounted rigidly thereon, the gear wheel meshing with gear wheel 111 on shaft 112, the latter being driven by pulley wheel 113 and belt 114, as shown in Figure 5. The drive for belt 114 is from a pulley wheel on shaft 137, Figure 2, and the drive between shafts 109 and 102 is through belt 103.

Referring especially to the structure of Figures 5 and 6, and the driving mechanism for the several rollers and for the upper and lower brushes, it will be observed that belt or chain 120 is driven from a pulley 121 on main driving shaft 40 of Figure 2. This belt passes over pulley wheel 122 on shaft 123 and the latter carries a pulley wheel 124 driving belt 125 passing over pulley wheel 126 on shaft 127 by means of which the upper rollers 80 are driven. Shaft 127 carries a pulley wheel 128 driving belt 129 passing over pulley wheel 130 on shaft 131 by means of which the rear rollers 82 are driven.

Shaft 123 carries a gear wheel 135 meshing with gear wheel 136 on shaft 137 and this shaft carries a gear wheel 138 meshing with pinion 139 on shaft 140 driving the upper brushes 84. Shaft 123 carries a gear wheel 123' driving pinion 123² on shaft 85' of lower brush 85. Shaft 137 carries a pulley wheel 137' driving belt 142 and pulley wheel 144 carried by shaft 145 mounting and driving the lower rollers 83, on each side of the machine. Also carried by shaft 145 is a pulley wheel 147 driving belt 148 passing over pulley wheel 149 on shaft 150, by means of which the lower forward rollers 81 are driven. The direction of rotation of the several rollers and brushes of Figure 5 is shown by the arrows in that view.

The cane passing from the rear rollers 82 and 83, on each side of the machine, passes downwardly through chutes or the like 79 previously referred to, and thence to the rear conveyors 62 and 63. Above these conveyors I position the rotating element of Figure 10, and the stripping plate 160, the individual elements of which may be spaced about as shown in that view. The rotatable element carries fork members cooperating with this stripping plate and the devices specified are designed to remove the unripe parts of the cane and throw them out of the path of the main body of the material passing over the rear conveyors.

The rotatable elements each include the body portion such as that shown in cross section in Figure 12 and preferably being of hexagonal form. The body portion is designated 161 and in each face thereof are bores 162 in which are mounted the shank portions of the forks. Springs 163 are positioned within the bores and provide a resilient mounting for the shanks of the forks. The shank portions are designated 164 and include heads 165 of the form shown in Figure 11, the heads being tapered and engaging the reduced portions of the bores at the entrance thereof. The shanks 164 each include a socket portion 166 receiving the forks per se designated 167 and having blade like prongs of the form shown in Figures 11 and 12.

Rotatable element or roller 161 carrying forks 167 has secured to each flat side thereof an apertured plate 168 having openings flared on their inner sides for engaging the tapered walls 164' of shanks 164. Any of the forks may be renewed upon the removal of the set screw, or the loosening of the set screw, illustrated as entering socket 166, at a point spaced from the outer face of the plate 168. This spring mounted fork is automatically adjustable, this adjustment being desirable on account of the varying size of the cane, and the forks strip from the stalks any leaves left by the brushes and remove the soft unripe cane tops. The edges of the prongs are sufficiently sharp to provide a cutting action and effectively accomplish the purpose intended. The soft unripe tops of the cane will be engaged by the forks, but ripe hard cane will pass on, the yielding of the springs mounting the forks, upon engagement by the hard surface of the stalks, permitting this action.

Rotatable element 161 is mounted on shaft 170 carrying pulley wheel 171 driven by belt 174. The belt passes over pulley wheel 175 on the shaft 72, previously referred to.

In the machine thus constructed, the cutters at the forward portion thereof will follow the exact contour of the land, and the saws revolving together and in the same direction will cut all of the cane, whether in the furrows, on the sides thereof, or on the tops of the furrows. The cutter blocks are permitted to tip upwardly in front, owing to the mounting specified, and the cutters will not engage the banks of water courses in the field, when passing thereover. On irrigated plantations the furrows run in every direction, and the machine is especially adapted for use under such conditions but is equally well adapted for use on unirrigated lands. Cane not cut, by the first line of saws will be engaged and cut by the saws in the second row, and the number of cutters in each row will be determined by the number of rows of cane to be cut at one time. It is immaterial whether the tonnage per acre is heavy or light. The rollers adjacent to the brushes will grip the stalks with sufficient pressure to insure constant feeding and to permit the satisfactory removal of the leaves by the brushes, the rear rollers also serving to keep the cane in position for cutting into short lengths by the swinging saws. These saws cut in both directions, at suitable speed, having in view the tonnage being handled. The cane drops thence into chute 79 and passes to the rear conveyors and the top separating mechanism, and is discharged to cars, or is otherwise disposed of in such manner that rehandling and the expense incident thereto will be avoided. The heavy expense of manual labor now extensively employed in most or all plantations is very greatly reduced, because of the capacity of the machine, and the high degree of efficiency thereof in operation. It is unnecessary to burn off a field for the purpose of getting rid of the mass of dried cane and leaves, and no good cane need be left in the field over night, either procedure, although frequently followed under present conditions, resulting in damage to the product.

Having thus described the invention, what is claimed as new, is:—

1. In a harvester, a series of cutters for severing the stalks near the surface of the ground, a conveyor for receiving stalks from the cutters, a plurality of rollers and brushes to which the stalks are conveyed, a swinging saw and means for moving the saw in an arc-shaped path parallel with the axes of the rollers, for cutting stalks discharged by the rollers, a conveyor receiving material from the saw, and means for separating tops from the stalks while passing over this conveyor.

2. In a harvester, a series of independently adjustable cutters for severing the stalks near the surface of the ground, a conveyor for receiving stalks from the cutters, a plurality of rollers and brushes to which the stalks are conveyed, a swinging saw and means for moving the saw in an arc-shaped path parallel with the axes of the rollers, for cutting stalks discharged by the rollers, a conveyor receiving material from the saw, and means for separating tops from the stalks while passing over this conveyor.

3. In a harvester, a series of cutters for severing the stalks near the surface of the ground, a conveyor for receiving stalks from the cutters, a plurality of rollers and brushes to which the stalks are conveyed, a swinging saw and means for moving the saw in an arc-shaped path parallel with the axes of the rollers, for cutting stalks discharged by the rollers, a conveyor receiving material from the saw, and means for separating tops from the stalks while passing over this conveyor, a driving shaft, means for driving the cutters from said shaft and devices for driving the rollers and brushes from this shaft.

4. In a harvester, a series of cutters for severing the stalks near the surface of the ground, a conveyor for receiving stalks from the cutters, a plurality of rollers and brushes to which the stalks are conveyed, a swinging saw and means for moving the saw in an arc-shaped path parallel with the axes of the rollers, for cutting stalks discharged by the rollers, a conveyor receiving material from the saw, means for separating tops from the stalks while passing over this conveyor, a driving shaft, means for driving the cutters from said shaft, a frame for mounting the saw, means for rotating the saw from the driving shaft, and means for imparting swinging movement to the frame from said driving shaft.

5. In a harvester, a series of cutters for severing the stalks near the surface of the ground, said cutters being automatically and independently adjustable in a vertical direction, a conveyor for receiving stalks from the cutters, a plurality of rollers and brushes to which the stalks are conveyed, a swinging saw and means for moving the saw in an arc-shaped path in a plane parallel with the axes of the rollers, a conveyor receiving material from the saw, and means for separating the tops from the stalks.

6. In a harvester, a series of cutters for severing the stalks near the surface of the ground, said cutters being automatically and independently adjustable, means for driving the cutters independently, a conveyor for receiving stalks from the cutters, a plurality of rollers and brushes to which the stalks are conveyed, a swinging saw and means for moving the saw in an arc-shaped path parallel with the axes of the rollers, a conveyor receiving material from the saw, and means for separating the tops from the stalks.

7. In a harvester machine, a cutter, a block for mounting the cutter on a vertical axis, means including worm gearing for rotating the cutter, means for driving the worm gearing, means for mounting the block for tilting movement about a horizontal axis, to permit the cutter to rise automatically and resume normal position, means for swiveling the mounting means last named, and guiding and spacing rollers mounted on the block and positioned at different elevations beneath the cutter.

8. In a harvester, a stripping plate formed with spaced tongues, and a rotatable device mounted adjacent to the plate, said device comprising a body portion having bores extending radially thereof, shank members having enlarged outer ends and movable in the bores, springs encircling the shank members, means limiting the outward movement of the shank members, and tapered cutting prongs carried by the shank members and adapted for cooperation with the stripping plate.

9. In a harvester machine, cane cutting means, conveying means, brushes for cleaning the cane, said brushes being in pairs on opposite sides of the machine, rollers mounted adjacent to the brushes and parallel therewith, and cutters rotatable about horizontal axes and in the path of movement of the cane after passing the rollers, means for mounting the cutters last named and causing each of them to swing in an arc-shaped path transversely of the path of movement of the cane, said means last named including downwardly extending arms pivotally mounted at their upper ends, a crank element positioned between the arms, and pitmans connected with the crank element and with said arms.

In testimony whereof I affix my signature.

HARRY F. DUNCAN.